UNITED STATES PATENT OFFICE.

BENJAMIN F. SHAW, OF CAMBRIDGE, MASSACHUSETTS.

IMPROVEMENT IN TREATING WASTE LIQUORS OF SLAUGHTER-HOUSES TO PRODUCE FERTILIZERS.

Specification forming part of Letters Patent No. 146,285, dated January 6, 1874; application filed December 6, 1873.

*To all whom it may concern:*

Be it known that I, BENJAMIN F. SHAW, of Cambridge, in the county of Middlesex and State of Massachusetts, have invented an Improvement in Defecating Waste Liquors of Slaughtering and Rendering Establishments; and I do hereby declare that the following is a description of my invention sufficient to enable those skilled in the art to practice it.

In swine-slaughtering establishments are tubs or vats partly filled with hot water (145° Fahrenheit) for scalding. The water is heated by means of steam applied directly from a pipe. A valve or gate permits the emptying of the vat. This water becomes foul with blood, manure, bristles, scurf, and other matters, and when so foul as to be intolerable, it is discharged, usually once a day, with its impurities, into drains. This disposition of it is wasteful, offensive, and deleterious. The liquid is rich in fertilizing substances, and, rapidly putrefying, is one of the most prolific sources of noxious exhalations.

It is desirable, therefore, to utilize the fertilizing substances, and so to purify the water that it can be used over and over again, and to thus reduce to the utmost the amount of putrescible matter to be discharged from the scalding-tub into the sewer.

Not only the contents of the scalding-tub, but the wet scrapings and the wash-waters of slaughter-houses, consisting largely of animal matters, are conveyed into drains, the pollution of which they increase. These animal substances, thus wasted, are worth saving, while the advantage of keeping sewers free from such highly-putrescible matters is very obvious. A process has been wanted for the defecation of the sewage-liquids, which process should be equally applicable to the treatment of the floor-washings and the contents of the scalding-tub. If a filter be employed, it will become clogged speedily, while, on the other hand, some of the uncoagulated blood of the floor-washing will pass through it during its operation. The matters it retained will become offensive and difficult of removal, and the filtering medium will require frequent renewal. If a precipitant, such as alum or sugar of lead, in conjunction with sulphuric acid or sulphate of potash—both well-known means for precipitating organic matters—is used in the scalding-tub, the mud-like, easily roiled precipitate itself will remain to be removed. The repeated use of the water will hardly be possible under the treatment, while the defecation would be slow and incomplete at best. If the agents commonly used for defecating sewage are employed upon the washings and scrubbings, too much time would be occupied in the process, while, for reasons just stated, these agents could not be applied with advantage to the scalding-tub.

The process which I have put into practice, and which constitutes my invention, is completely successful, purifying the water, saving for the soil the valuable manurial substances hitherto thrown away, and obviating the nuisance that arises from the presence of these substances in drains, pools, or similar receptacles.

In carrying out my process, with reference to the scalding-tub alone, I prefer to mix with the water two or three pailfuls of charcoal-dust, which may be procured of dealers in charcoal, and then allow the water to cool down, if necessary, to any point at which it will not coagulate albumen, say, to about 90° Fahrenheit, and this may occur in the interval between the hours of slaughtering. If not more than an hour can be given to this defecating process, ice may be added. A quantity of ice equal to a little over one-fourth ($\frac{55}{200}$) of the cubic feet of water in the tub will reduce the temperature from 145° to 90° immediately. Very good results are attained by introducing the blood, as hereafter explained, at higher temperature, but I prefer the temperature named. When the water is cooled sufficiently, I stir into it (thoroughly stirring up the settled matters,) a quantity of blood, and, after the whole mass has been thoroughly mixed, I boil it for a few moments. The coagulum formed by this means incloses the charcoal and the impurities that were suspended in the water, and is to be removed. A skimmer or strainer of netted wire is convenient for this purpose. The water is now found to be pure and sweet enough to be used again, so that it may be used and revived many times consecutively. Whenever it is discharged, it may be treated with a little lime, chloride of lime, or carbolic acid, if deemed expedient. It is well to keep it hot, while not cooling down to be defecated—as over Sunday—the heat tending to keep it sweet.

The scrapings and wash-waters of the establishment may be collected in a vat supplied with a steam-heating pipe; and this vat may receive the scalding water also, whenever that shall be discharged, and the whole mass defecated with blood and charcoal at one operation. It is possible in this way to prevent wholly the escape of blood, particles of manure, and other undissolved matters from the drains of slaughtering establishments; but chondrine, gelatine, and redissolved albumen in solution in soups or rendering-liquors are not recoverable by this means. The blood should be prepared for the process by being stirred, while very freshly drawn, with a small rough stick or a few twigs, as it is commonly treated for refining sugar. Twenty to thirty gallons to the water commonly employed in a scalding-tub of two hundred cubic feet capacity are sufficient. Mineral acids or their metallic salts may be added to the water, with or without heat, to coagulate the blood, but heat alone is cheap, convenient, and effectual, and, with reference to the scalding-tub, is preferable, since it leaves no chemical to interfere with the succeeding scalding process or to affect the skin of the pigs. The serous fluid only of the blood, or albumen, may be used, but it is no better than the blood.

The mass recovered from the scalding and waste waters may be dried and powdered in any of the apparatus for drying and powdering animal matter, or prepared in any other convenient way.

To recapitulate, the best application of my process to the scalding-tub is, first, to stir into the water a few buckets of charcoal-dust; second, to cool the water down to 90° Fahrenheit, or under, with or without ice; third, to stir into it a half-barrel or more of defibrinated blood; fourth, to boil the mass and remove the froth, scum, or coagulum.

The adaptation of this process to the defecation of the floor washings and scrubbings will be obvious from the foregoing description. The waste heat or exhaust steam of the engine may be utilized in heating the vat.

The use of blood in clarifying sirups, gelatines, and other liquids, and of animal charcoal in decolorizing and deodorizing liquids, is practiced in all civilized countries; but these agents are employed for the purpose and to the effect of giving good qualities to the various articles that result from the manufacture of the solutions which have been subjected to their action. In England the A-B-C process for the defecation of sewage employs, among other articles, alum, blood, charcoal, and clay. These matters are described as forming a flocculent precipitate. It is also stated that the presence of either of these in sufficient quantity in the sewage obviates the necessity of its introduction. Now, one of the liquids upon which my process is employed contains, as an impurity, a larger proportion of blood than is required in the A-B-C process; and it probably exists there as a flocculent precipitate from the coagulation of it in the hot water and the violent agitation of the water in the process of scalding. The mere addition of alum and clay to this liquid would augment the precipitate of small particles and involve the employment of a strainer or filter, and, while effecting only a partial defecation, would prevent the repeated use of the water; but, by adding defibrinated blood, under the conditions specified hereinbefore, and boiling the mass, no troublesome flocculent precipitate is formed. On the contrary, that which was formed, together with all the other mechanical impurities, is made quickly into a somewhat tenacious scum or coagulum, easily and completely removable from the surface of the water. The defecation is, therefore, by the boiling of the defibrinated blood, much more speedy, convenient, economical, and complete than it would be if the liquid were settled by means of alum and clay without heat.

I do not claim the use of blood or albumen and charcoal in clarifying liquids, nor the use of blood in defecating sewage.

I do claim—

The process of defecating the water of the scalding-tub, and other waste liquors, washing and scrubbing waters of slaughtering and rendering establishments, by means of blood or albumen and heat, with or without charcoal or chemical reagents, substantially as described.

B. F. SHAW.

Witnesses:
 FRANCIS GOULD,
 M. W. FROTHINGHAM.